US 12,022,054 B2
Jun. 25, 2024

(12) United States Patent
Jamali et al.

(54) VOLUMETRIC DISPLAY INCLUDING LIQUID CRYSTAL-BASED LENSES

(71) Applicant: Meta Platforms Technologies, LLC, Menlo Park, CA (US)

(72) Inventors: Afsoon Jamali, Redmond, WA (US); Yang Zhao, Kirkland, WA (US); Wai Sze Tiffany Lam, Redmond, WA (US); Lu Lu, Kirkland, WA (US); Douglas Robert Lanman, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,436

(22) Filed: Jan. 31, 2022

(65) Prior Publication Data

US 2022/0159236 A1 May 19, 2022

Related U.S. Application Data

(63) Continuation of application No. 16/723,152, filed on Dec. 20, 2019, now Pat. No. 11,240,488.
(Continued)

(51) Int. Cl.
*H04N 13/388* (2018.01)
*G02F 1/01* (2006.01)
(Continued)

(52) U.S. Cl.
CPC ........... *H04N 13/388* (2018.05); *G09G 3/003* (2013.01); *H04N 13/332* (2018.05); *H04N 13/398* (2018.05); *G02F 1/0136* (2013.01)

(58) Field of Classification Search
CPC .. H04N 13/239; H04N 13/279; H04N 13/344; H04N 13/366; H04N 13/383;
(Continued)

(56) References Cited

U.S. PATENT DOCUMENTS 9,106,902 B2 * 8/2015 Shin ..................... H04N 13/207
10,025,060 B2   7/2018 Lanman et al.
(Continued)

FOREIGN PATENT DOCUMENTS

CN         101013192 A      8/2007

OTHER PUBLICATIONS

Co-Pending U.S. Appl. No. 16/355,612, filed Mar. 15, 2019, 66 Pages.
(Continued)

*Primary Examiner* — Nathnael Aynalem
(74) *Attorney, Agent, or Firm* — Foley & Lardner LLP

(57) ABSTRACT

A volumetric display may include a two-dimensional display; a varifocal optical system configured to receive image light from the two-dimensional display and focus the image light; and at least one processor configured to: control the two-dimensional display to cause a plurality of sub-frames associated with an image frame to be displayed by the display, wherein each sub-frame of the plurality of sub-frames includes a corresponding portion of image data associated with the image frame; and control the varifocal optical system to a corresponding focal state for each respective sub-frame.

20 Claims, 12 Drawing Sheets

Related U.S. Application Data

(60) Provisional application No. 62/905,113, filed on Sep. 24, 2019.

(51) Int. Cl.
  *G09G 3/00* (2006.01)
  *H04N 13/332* (2018.01)
  *H04N 13/398* (2018.01)

(58) Field of Classification Search
  CPC ......... H04N 2013/0081; H04N 13/117; H04N 13/371; H04N 13/128; H04N 13/275; H04N 13/388; H04N 13/395; H04N 13/39; H04N 13/189; H04N 13/271; H04N 13/398; H04N 13/332; G09G 3/003; G02F 1/0136; G06T 2207/20021; G06T 2207/20016; G06T 7/223
  USPC ............................................................ 345/8
  See application file for complete search history.

(56) References Cited

U.S. PATENT DOCUMENTS

| | | | |
|---|---|---|---|
| 10,120,193 B2* | 11/2018 | Lam | G02B 27/0172 |
| 10,681,328 B1* | 6/2020 | Shpunt | G02B 30/35 |
| 10,884,263 B2 | 1/2021 | Choi et al. | |
| 11,240,488 B2 | 2/2022 | Jamali et al. | |
| 2014/0064567 A1* | 3/2014 | Kim | G06T 7/223 |
| | | | 382/107 |
| 2014/0233915 A1* | 8/2014 | Middleton | G11B 27/031 |
| | | | 386/282 |
| 2016/0026253 A1* | 1/2016 | Bradski | H04N 13/128 |
| | | | 345/8 |
| 2017/0115519 A1 | 4/2017 | Shi et al. | |
| 2017/0176753 A1 | 6/2017 | Shi et al. | |
| 2017/0255012 A1* | 9/2017 | Tam | G02B 27/0179 |
| 2017/0301313 A1 | 10/2017 | Perreault | |
| 2018/0024355 A1 | 1/2018 | Gao et al. | |
| 2018/0157320 A1 | 6/2018 | Trail | |
| 2018/0203505 A1* | 7/2018 | Trail | G06F 1/163 |
| 2018/0239177 A1* | 8/2018 | Oh | G02B 5/30 |
| 2018/0275410 A1 | 9/2018 | Yeoh et al. | |

OTHER PUBLICATIONS

International Search Report and Written Opinion for International Application No. PCT/US2020/049604, mailed Nov. 17, 2020, 11 Pages.
Lee Y.H., et al., "Compact See-through Near-Eye Display with Depth Adaption," Journal of the Society for Information Display, Feb. 1, 2018, vol. 26 (2), pp. 64-70.
Tan G., et al., "Polarization-Multiplexed Multiplane Display," Optics Letters, Nov. 15, 2018, vol. 43 (22), pp. 5651-5654.
Zhan T., et al., "High-Resolution Additive Light Field Near-Eye Display by Switchable Pancharatnam-Berry Phase Lenses," Optics Express, Feb. 15, 2018, vol. 26 (4), XP055590399, pp. 4863-4872.
Zhan T., et al., "Pancharatnam-Berry Optical Elements for Head-Up and Near-Eye Displays [Invited]," Journal of the Optical Society of America B, Feb. 22, 2019, vol. 36 (5), pp. D52-D65.
Prosecution History dated Jan. 22, 2021 through Dec. 27, 2021 for U.S. Appl. No. 16/723,152, filed Dec. 20, 2019, 77 pages.
International Preliminary Report on Patentability for International Application No. PCT/US2020/049604, mailed Apr. 7, 2022, 9 pages.

* cited by examiner

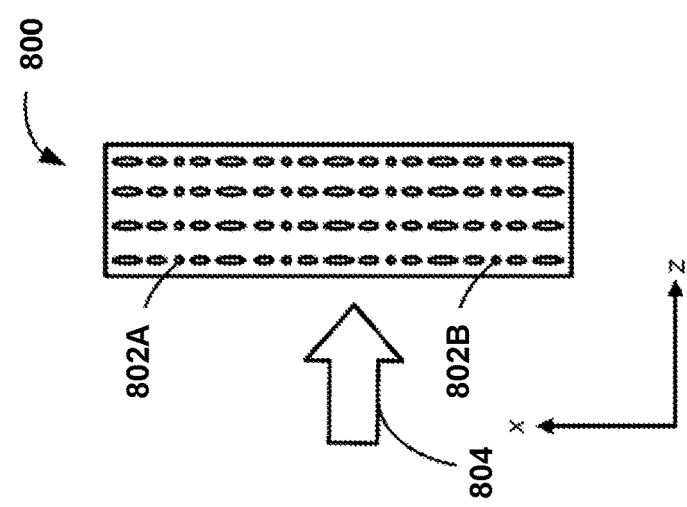
FIG. 8C
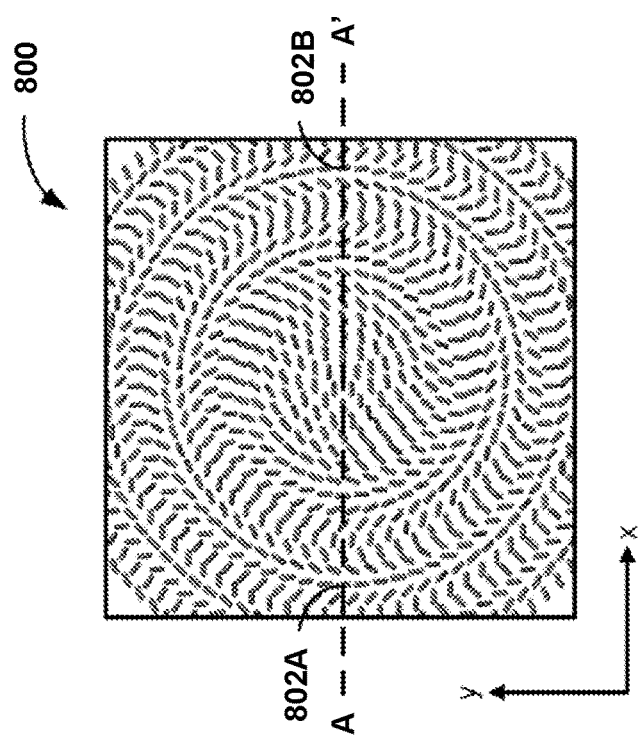
FIG. 8B
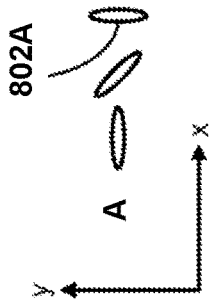
FIG. 8D
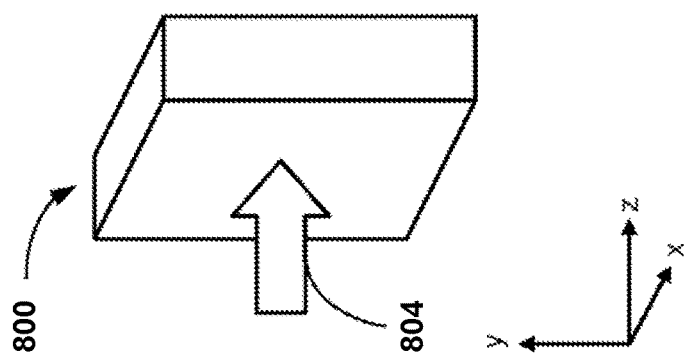
FIG. 8A

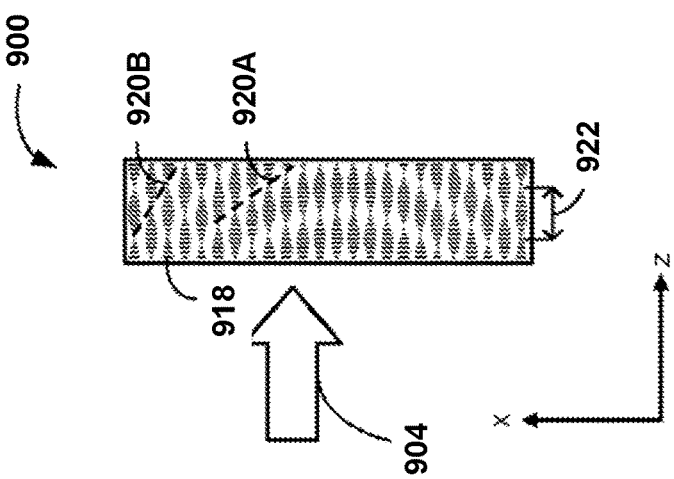
FIG. 9C
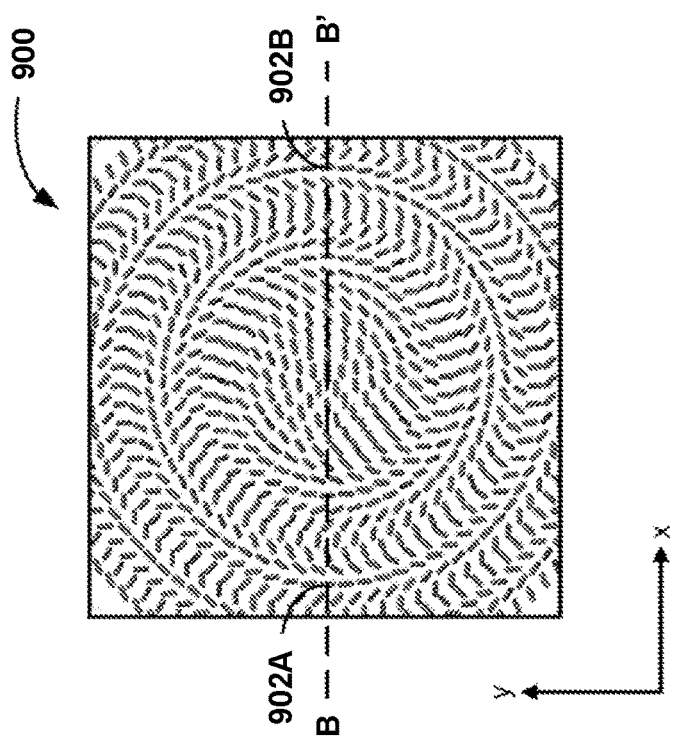
FIG. 9B
FIG. 9A
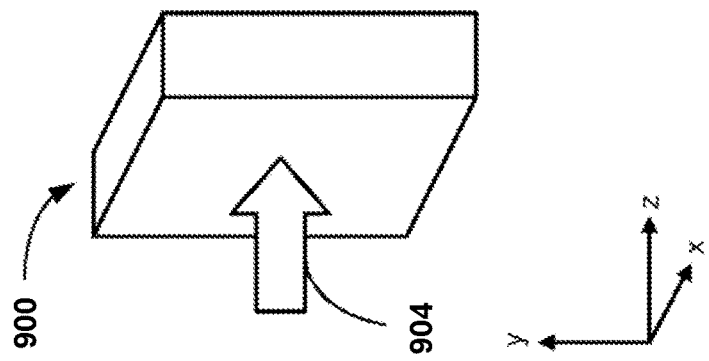
FIG. 9D

VOLUMETRIC DISPLAY INCLUDING LIQUID CRYSTAL-BASED LENSES

This application is a continuation of U.S. application Ser. No. 16/723,152, filed on Dec. 20, 2019, which claims the benefit of U.S. Provisional Application No. 62/905,113, filed Sep. 24, 2019, the entire contents of all applications being incorporated by reference herein.

TECHNICAL FIELD

The disclosure generally relates to artificial reality systems, such as mixed reality and/or virtual reality systems.

BACKGROUND

Artificial reality systems have applications in many fields such as computer gaming, health and safety, industry, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely consist of content that is generated by the system or may include generated content combined with real-world content (e.g., pass through views or captured real-world video and/or images of a user's physical environment). During operation, the user typically interacts with the artificial reality system to select content, launch applications, configure the system and, in general, experience artificial reality environments.

SUMMARY

In general, the disclosure describes artificial reality systems and, more specifically, an artificial reality system that includes a volumetric display. As used herein, a volumetric display is a display that forms a visual representation of an object or a scene in apparent three-dimensions, rather than a two-dimensional planar image. The volumetric display described herein may include a two-dimensional planar display and a varifocal optical system. One or more processors may be configured to process an image frame to generate a plurality of sub-frames. Each sub-frame includes only a portion of the image data from the image frame. The portion of the image data for each sub-frame corresponds to a depth or depth range within the image frame. Taken together, the plurality of sub-frames collectively represent all image date in the frame, but each sub-frame only includes some of the image data.

To produce the volumetric image for display, the one or more processors is configured to coordinate the output of the sub-frames by the display and the focal distance of the varifocal optical system such that the focal distance of the varifocal optical system correlates with the depth associated with the displayed sub-frame. To display an entire image frame, the one or more processors controls the display to output the sub-frames in a sequence and controls the focal distance of the varifocal optical system as each of the sub-frames are displayed. This technique takes advantage of persistence of vision, which allows the user's visual system to effectively combine the portions of the image data included in the sub-frames to recreate the image frame.

In one or more example aspects, the disclosure describes a volumetric display comprising: a two-dimensional display; a varifocal optical system configured to receive image light from the two-dimensional display and focus the image light; and at least one processor configured to: control the two-dimensional display to cause a plurality of sub-frames associated with an image frame to be displayed by the display, wherein each sub-frame of the plurality of sub-frames includes a corresponding portion of image data associated with the image frame; and control the varifocal optical system to a corresponding focal state for each respective sub-frame.

In some examples, the disclosure describes a system comprising: a head-mounted display comprising: a housing; a two-dimensional display mechanically coupled to the housing; a varifocal optical system mechanically coupled to the housing and configured to receive image light from the two-dimensional display and focus the image light; and at least one processor configured to: cause a plurality of sub-frames associated with an image frame to be displayed by the display, wherein each sub-frame of the plurality of sub-frames includes a corresponding portion of image data associated with the image frame, and wherein the plurality of sub-frames together include all of the image data associated with the image frame; and control the varifocal optical system to a corresponding focal state for each respective sub-frame.

In some examples, the disclosure describes a method that includes causing, by one or more processors, a plurality of sub-frames associated with an image frame to be displayed by a two-dimensional display, wherein each sub-frame of the plurality of sub-frames includes a corresponding portion of image data associated with the image frame, and wherein the plurality of sub-frames together include all of the image data associated with the image frame; and controlling, by the one or more processors, a varifocal optical system to a corresponding focal state for each respective sub-frame, wherein the varifocal optical system is configured to receive image light from the two-dimensional display and focus the image light.

The details of one or more examples are set forth in the accompanying drawings and the description below. Other features, objects, and advantages will be apparent from the description and drawings, and from the claims.

BRIEF DESCRIPTION OF DRAWINGS

FIGS. 8A-8D are schematic diagrams illustrating an example Pancharatnam-Berry phase (PBP) lens in accordance with some examples of the disclosure.

FIG. 9A-9D are schematic diagrams illustrating an example polarization sensitive hologram (PSH) lens in accordance with some examples of the disclosure.

DETAILED DESCRIPTION

Figure 1:
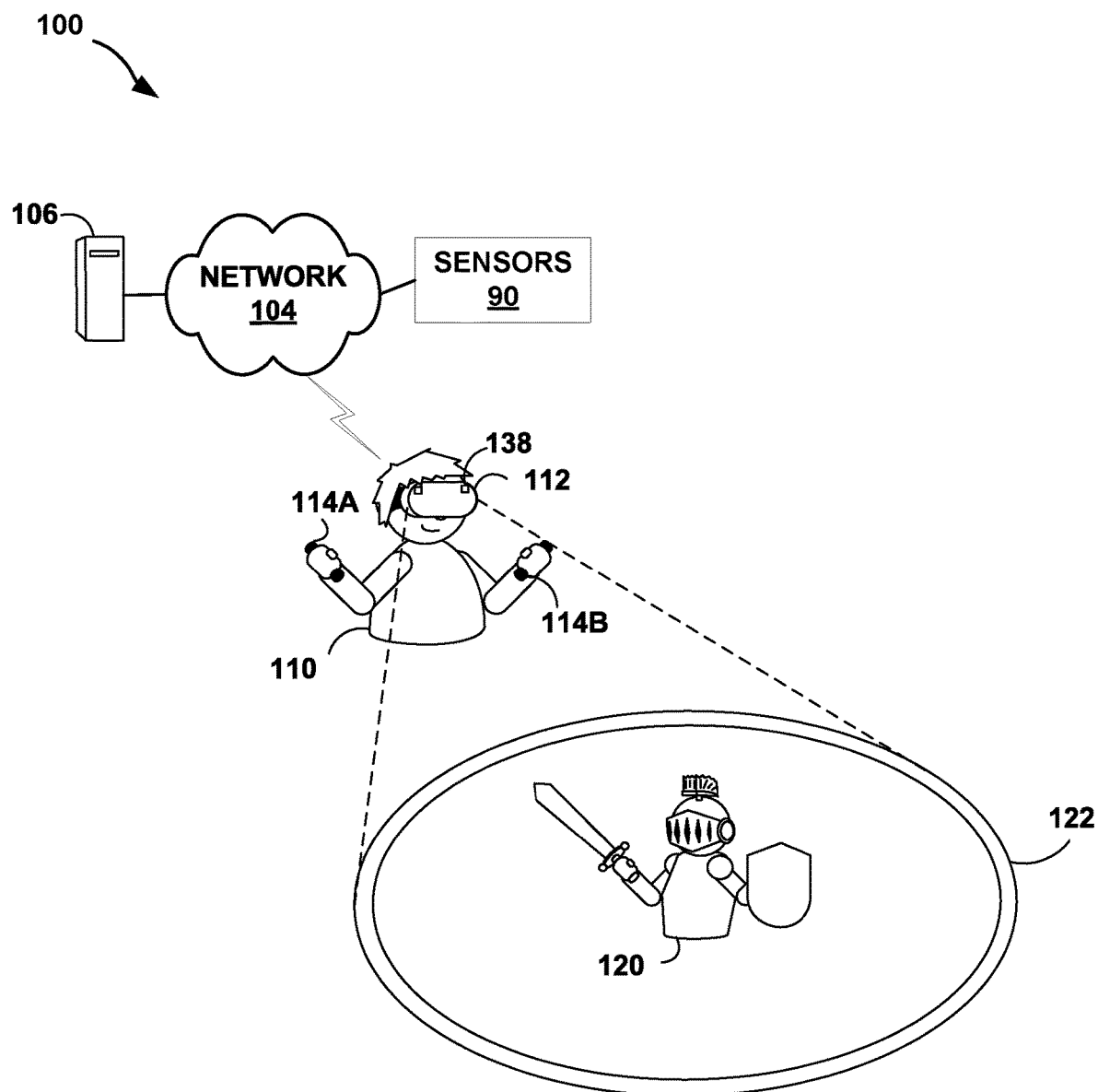
FIG. 1 is an illustration depicting an example artificial reality system that includes a volumetric display, in accordance with the techniques described in this disclosure.

FIG. 1 is an illustration depicting an example artificial reality system includes a volumetric display, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

In accordance with the techniques of this disclosure, HMD 112 includes a volumetric display that includes a display and a varifocal optical system. The display may be a two-dimensional planar display, such as a liquid crystal display (LCD), an organic light emitting diode (OLED) display, an active matrix OLED (AMOLED) display, a micro light emitting diode (microLED) display, or the like. The varifocal optical system may include a plurality of optical elements, at least some optical elements including a controllable focal power. For example, the varifocal optical system may include a plurality of polarization sensitive optical elements, such as lenses formed from liquid crystals, such as Pancharatnam-Berry Phase (PBP; also referred to as geometric phase) lenses, polarization sensitive hologram (PSH) lenses, metamaterials, and/or liquid crystal optical phase arrays. By controlling polarization of light incident on each respective polarization sensitive optical element, and/or a state of the polarization sensitive optical element, the optical system may be controlled to have a selected total optical power. In this way, the optical system may be a varifocal optical system.

One or more processors (e.g., of HMD 112, console 116, or the like) may be configured to process an image frame of artificial reality content 122 to generate a plurality of sub-frames. Each sub-frame includes a portion of the image data from the image frame. The portion of the image data for each sub-frame corresponds to a depth or depth range within the image frame. For example, each rendered pixel may have a plurality of values associated with it (e.g., color, brightness, positional coordinates, or the like), one of which may represent depth within the image. The one or more processors may group pixels with depth values within a selected range into a sub-frame. The depth ranges may be selected so the plurality of sub-frames collectively represent substantially all image date in the frame, but each sub-frame only includes some of the image data.

To produce the volumetric image for display, the one or more processors is configured to coordinate the output of the sub-frames by the display and the focal distance of the varifocal optical system (e.g., by controlling the state of the polarization sensitive optical element and/or other optical elements to control polarization of light incident on each polarization sensitive optical element) such that the focal distance of the varifocal optical system correlates with the depth associated with the displayed sub-frame (e.g., the one or more processors controls the varifocal optical system to have a focal length correlating with the depth of the sub-frame being displayed so that sub-frames with a higher depth value are displayed when the varifocal optical system is in a state that makes the sub-frame appear to be further from the viewer). To display an entire image frame, the one or more processors controls the display to output the sub-frames in a sequence and controls the focal state of the varifocal optical system as each of the sub-frames are displayed. This technique takes advantage of persistence of vision, which allows the user's visual system to effectively combine the portions of the image data included in the sub-frames to recreate the image frame.

Figure 2A:
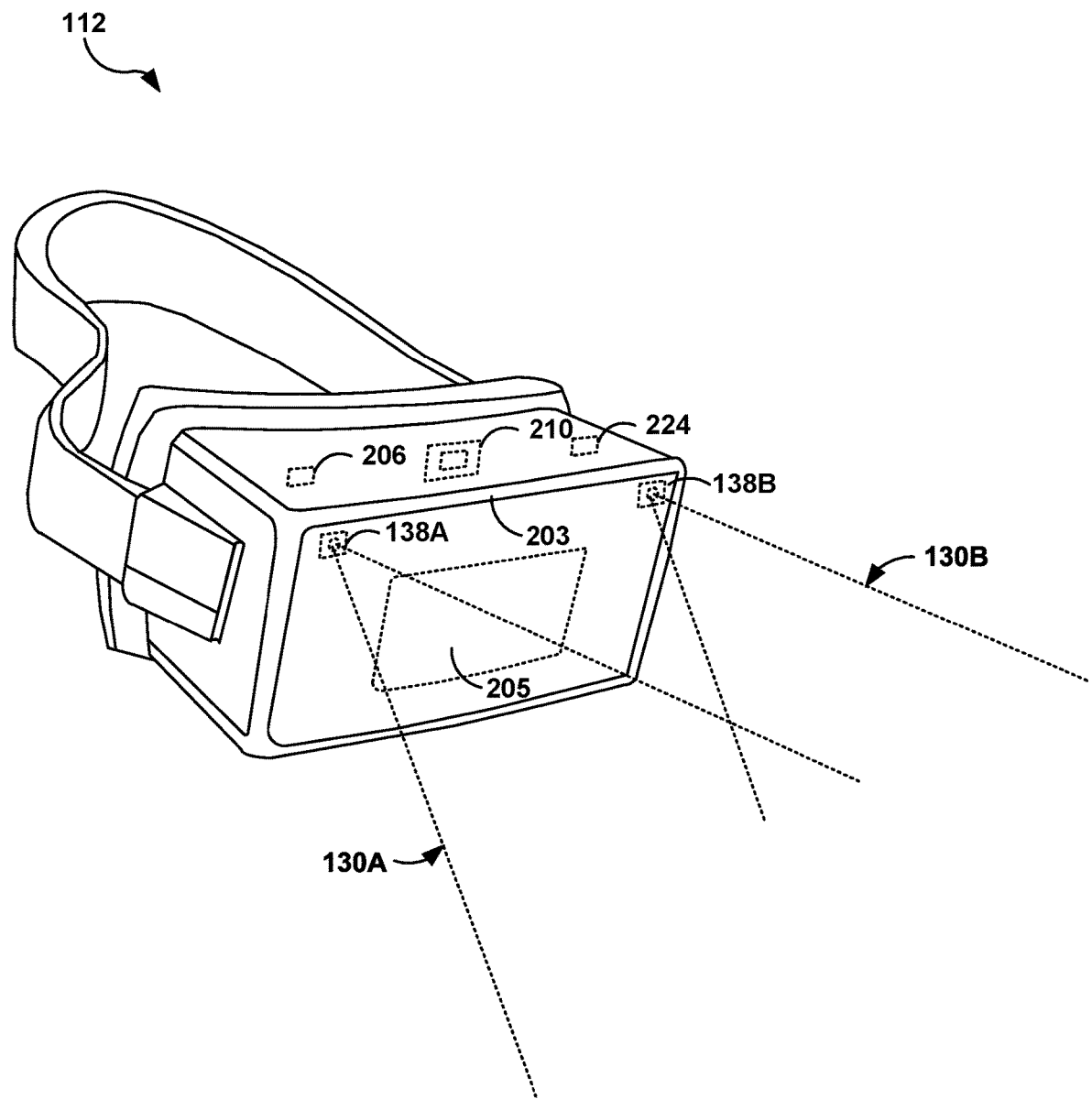
FIG. 2A is an illustration depicting an example HMD that includes a volumetric display, in accordance with techniques described in this disclosure.

FIG. 2A is an illustration depicting an example HMD 112 that includes a volumetric display including a display and a varifocal optical system, in accordance with techniques described in this disclosure. HMD 112 of FIG. 2A may be an example of HMD 112 of FIG. 1. HMD 112 may be part of an artificial reality system, such as artificial reality system 100 of FIG. 1, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user via a varifocal optical system 205. Electronic display 203 may be any suitable display technology, as described above. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head-mounted displays, such as glasses or goggles.

Varifocal optical system 205 includes optical elements configured to manage light output by electronic display 203 for viewing by the user of HMD 112 (e.g., user 110 of FIG. 1). The optical elements may include, for example, one or more lens, one or more diffractive optical element, one or more reflective optical elements, one or more waveguides, or the like, that manipulates (e.g., focuses, defocuses, reflects, refracts, diffracts, or the like) light output by electronic display 203. For example, varifocal optical system 205 may be any of the varifocal optical systems described herein with reference to FIGS. 1, 6, 7, and 8.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 2B:
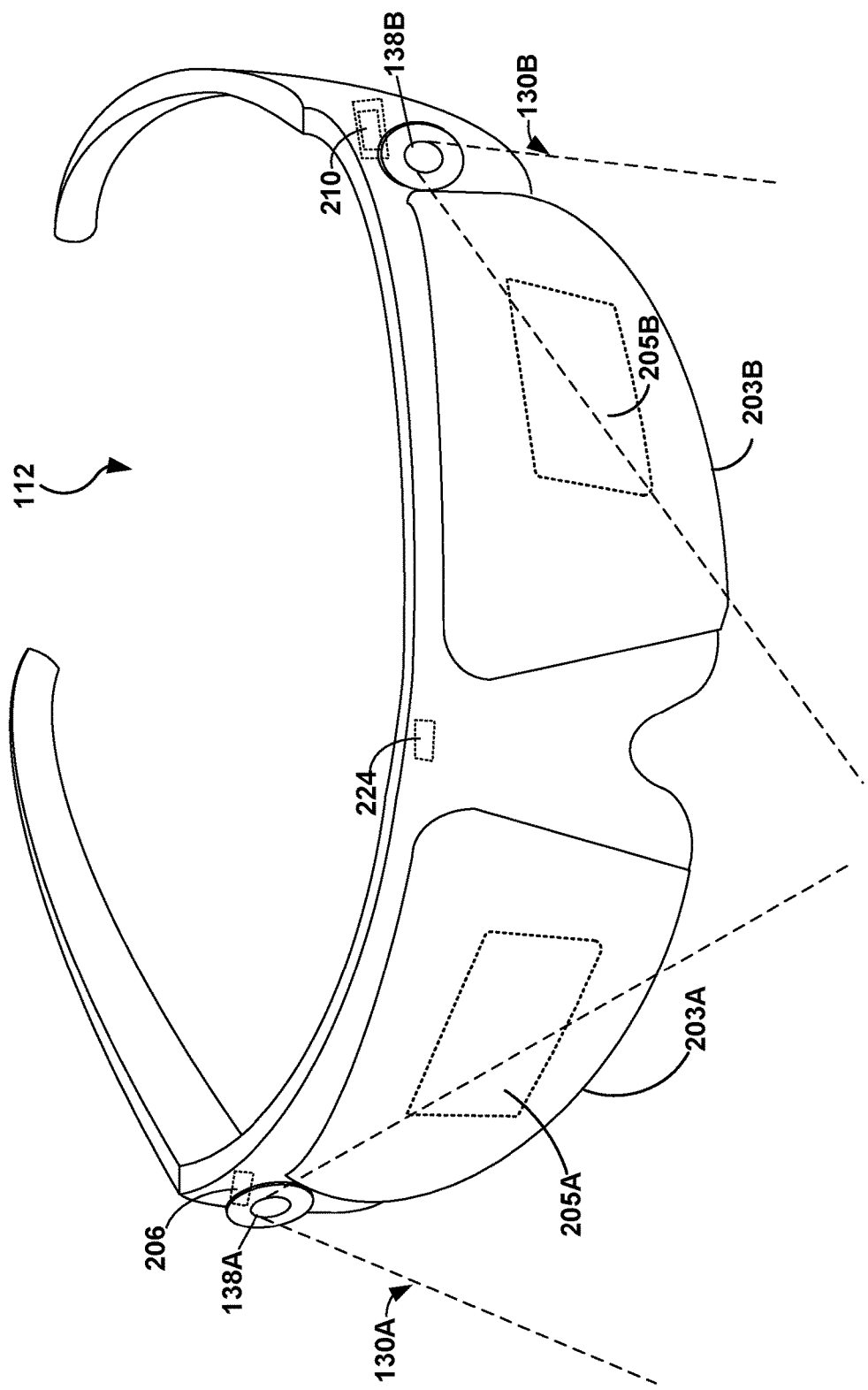
FIG. 2B is an illustration depicting another example HMD that includes a volumetric display, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of HMD 112 of FIG. 1. HMD 112 may be part of an artificial reality system, such as artificial reality system 100 of FIG. 1, or may operate as a stand-alone, mobile artificial reality system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes one or more interior-facing electronic displays 203A and 203B (collectively, "electronic displays 203") configured to present artificial reality content to the user and one or more varifocal optical systems 205A and 205B (collectively, "varifocal optical systems 205") configured to manage light output by interior-facing electronic displays 203. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, one or more integrated image capture devices 138A and 138B (collectively, "image capture devices 138"), an internal control unit 210, which may include an internal power source and one or more printed-circuit boards having one or more processors, memory, and hardware to provide an operating environment for executing programmable operations to process sensed data and present artificial reality content on display 203.

Figure 3:
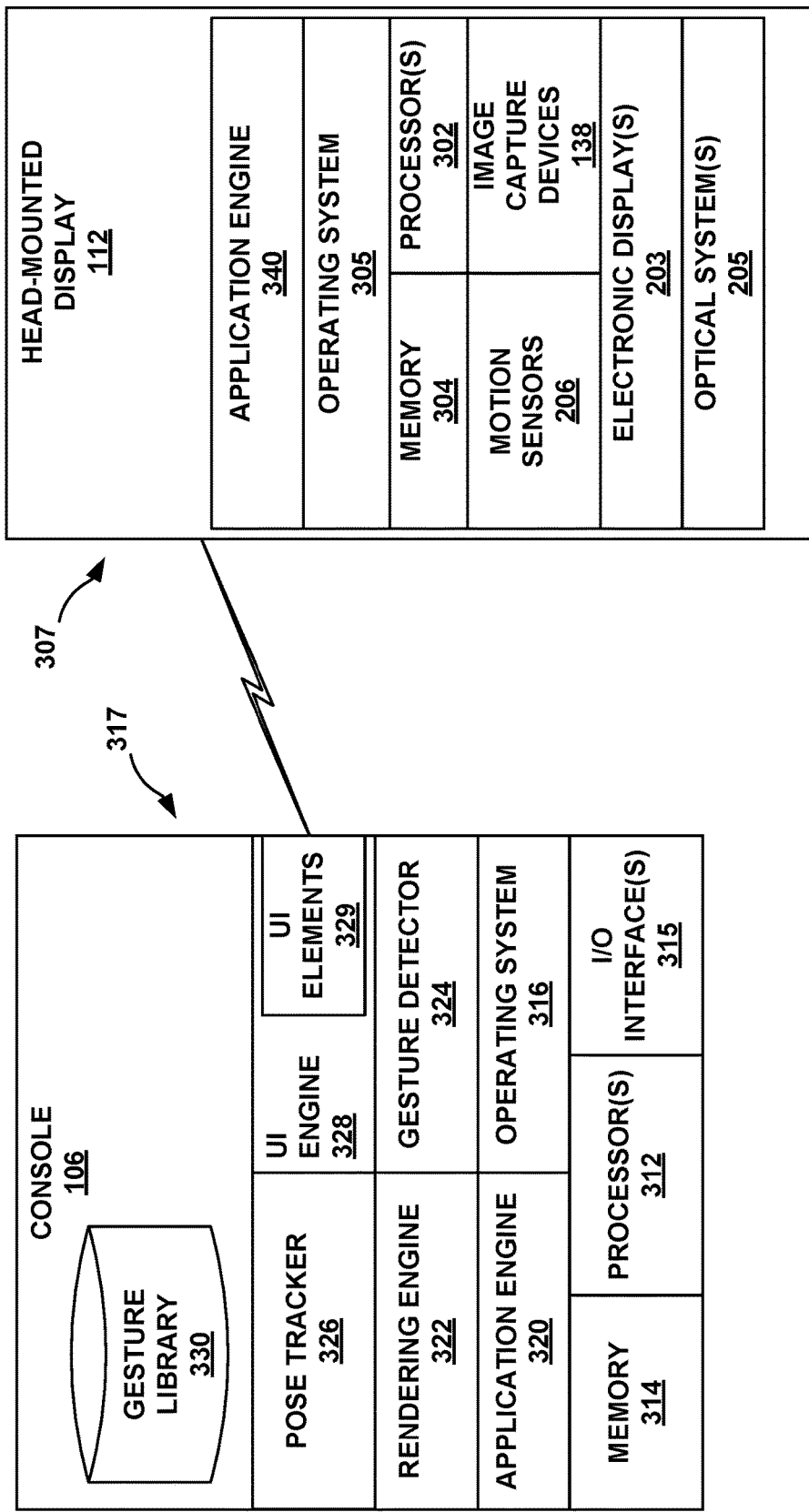
FIG. 3 is a block diagram showing example implementations of a console and an HMD of the multi-device artificial reality system of FIG. 1, in accordance with techniques described in this disclosure.

FIG. 3 is a block diagram showing example implementations of an artificial reality system that includes console 106 and HMD 112, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206, image capture devices 138, and, in some examples, optical system 205. In some examples, processors 302 and memory 304 may be separate, discrete components. In other examples, memory 304 may be on-chip memory collocated with processors 302 within a single integrated circuit.

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 and external cameras 102 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114and process the user inputs to detect one or more gestures performed by user 110 with respect to controller(s) 114.

In accordance with the techniques described herein, electronic display(s) 203 and varifocal optical system(s) 205 provide a volumetric display for HMD 112. Electronic display(s) 203 may be any of the displays described herein, and varifocal optical system(s) 205 may be any of the varifocal optical systems described herein.

Figure 4:
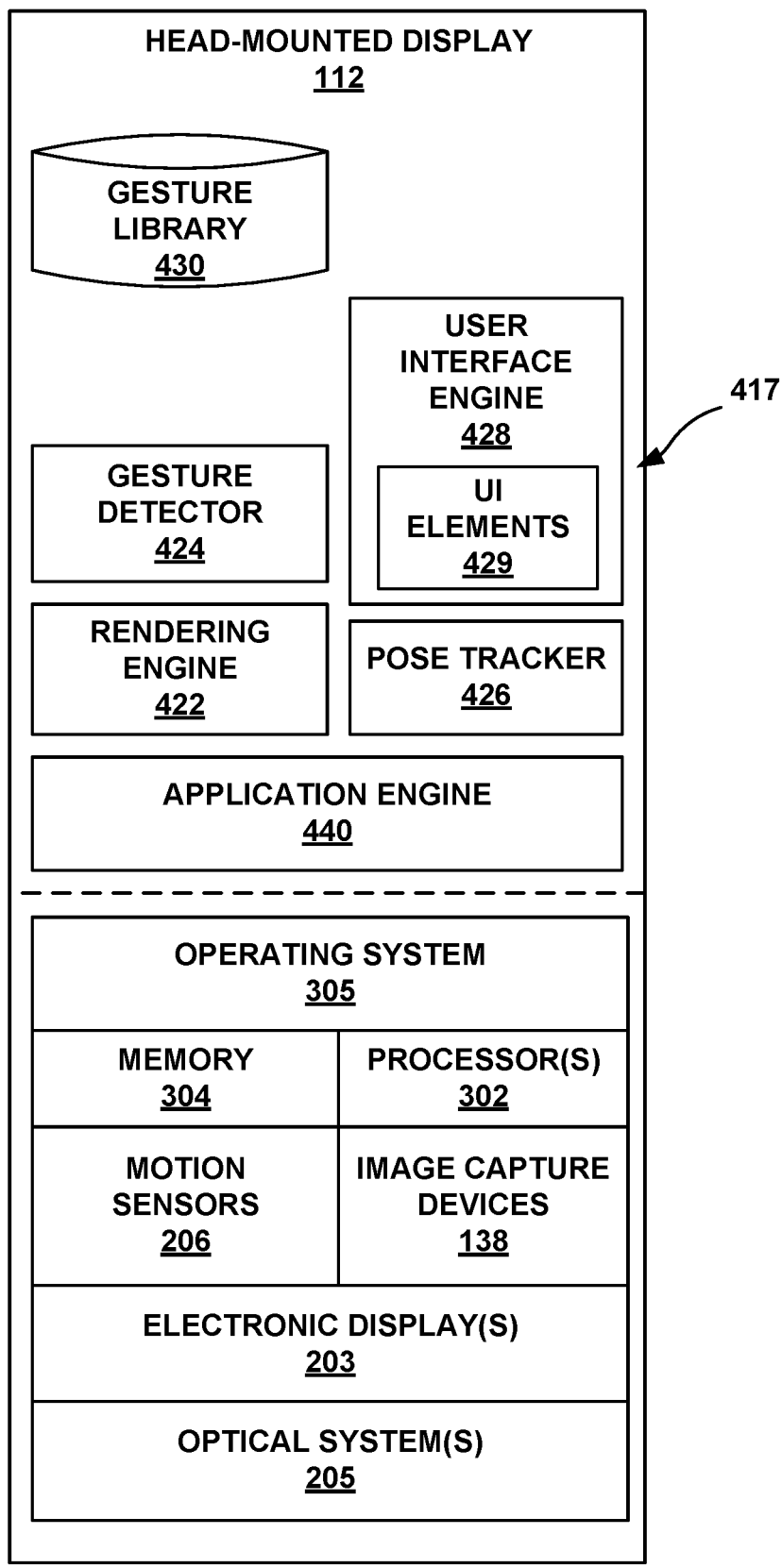
FIG. 4 is a block diagram depicting an example in which gesture detection, user interface generation, and virtual surface functions are performed by the HMD of the artificial reality system of FIG. 1, in accordance with the techniques described in this disclosure.

FIG. 4 is a block diagram depicting an example in which HMD 112 is a standalone artificial reality system, in accordance with the techniques described in this disclosure. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 203, varifocal optical system(s) 205, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, controller(s) 114, or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

Figure 5:
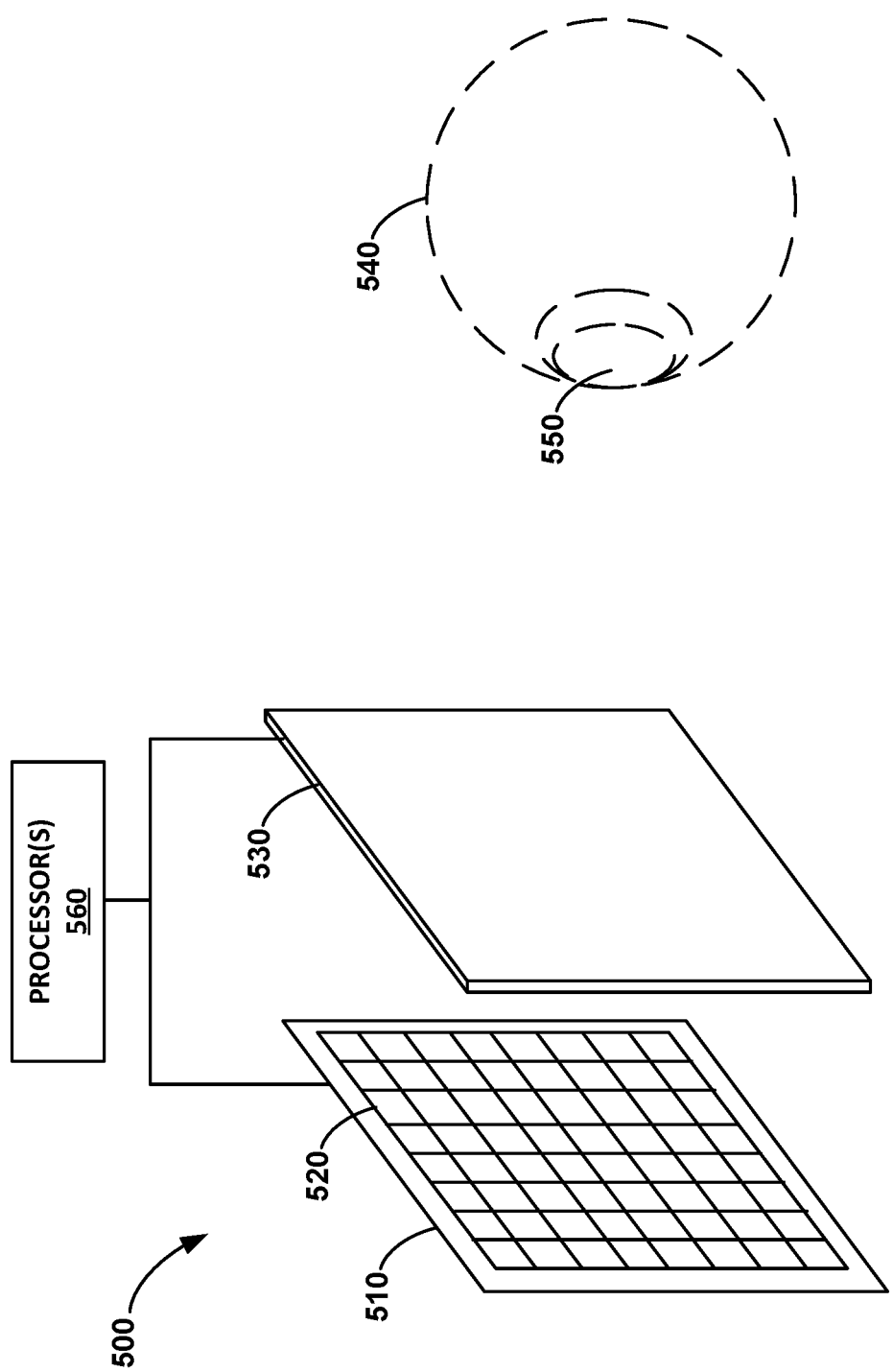
FIG. 5 is an isometric view of an example volumetric display in accordance with some examples of the disclosure.

FIG. 5 is an isometric view of an example volumetric display 500 in accordance with some examples of the disclosure. In some examples, volumetric display 500 includes light emission device array 510 and a varifocal optical system 530. Light emission device array 510 emits image light toward the viewing user. Light emission device array 510 may be, e.g., an array of LEDs, an array of microLEDs, an array of OLEDs, or some combination thereof. Light emission device array 510 includes light emission devices 520 that emit light in the visible range.

In some examples, volumetric display 500 includes an emission intensity array configured to selectively attenuate light emitted from light emission array 510. In some examples, the emission intensity array is composed of a plurality of liquid crystal cells or pixels, groups of light emission devices, or some combination thereof. Each of the liquid crystal cells is, or in some examples, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array can control what portion of the image light emitted from light emission device array 510 is passed to varifocal optical system 530. In some examples, volumetric display 500 uses an emission intensity array to facilitate providing image light to a location of pupil 550 of eye 540 of a user and minimize the amount of image light provided to other areas in the eyebox.

Varifocal optical system 530 receives the image light (e.g., attenuated light) from emission intensity array (or directly from emission device array 510) and directs the image light to a location of pupil 550 in a manner that the perceived image is at the appropriate distance.

In some examples, volumetric display 500 includes one or more broadband sources (e.g., one or more white LEDs) coupled with a plurality of color filters, in addition to, or instead of, light emission device array 510.

Varifocal optical system 530 includes a plurality of polarization sensitive lenses, such as PBP lenses (also referred to as geometric phase lenses), PSH lenses, metamaterials, and/or liquid crystal optical phase arrays. By controlling polarization of light incident on each respective lens, and/or a state of the lens, the optical system may be controlled to have a selected total optical power. In this way, the optical system may be a varifocal optical system.

Volumetric display 500 is coupled to one or more processors 560. Processor(s) 560 is configured to control light emission device array 510 to display images and configured to control varifocal optical system 530 to set a focal length of varifocal optical system 530. Processor(s) 560 may represent any of the processors described herein, including processors 302 and 312 shown in FIGS. 3 and 4. Processor(s) 560 may include application-specific or other control circuitry, processing cores for executing instructions, discrete logic, or other hardware elements.

Processor(s) 560 may be configured to process an image frame of artificial reality content to generate a plurality of sub-frames for display at light emission device array 510. Processor(s) 560 may process the image frame such that each sub-frame includes only a portion of the image data from the image frame. For example, processor(s) 560 may bin pixels from the image frame based on depth information associated with the image frame. Each pixel output for display may include an associated depth value, which may correspond to a distance of the respective pixel from a virtual camera position. The virtual camera position may correlate with a viewing perspective of HMD 112 (FIG. 1).

Processors(s) 560 may group pixels with depth values within a selected range to generate a sub-frame. For example, processor(s) 560 may be configured to generate a predetermined number of sub-frames and may bin pixels into a corresponding number of depth ranges. As a particular example, processor(s) 560 may be configured to generate eight sub-frames for each image frame. Processor(s) 560 may bin pixels into eight ranges based on depth information associated with the pixels. The first bin may include pixels associated with a low depth value (e.g., pixels closest to the virtual camera coordinate, associated with a depth value between for example, 0 and D1), the second bin may include pixels associated with depth values within a second range (e.g., between a depth value of D1 and a depth value of D2), the third bin may include pixels associated with depth values within a third range (e.g., between a depth value of D2 and D3), and so on. The ranges may be predetermined, determined based on a total depth range within the image frame, or the like. The depth ranges may be selected so the plurality of sub-frames (e.g., eight sub-frames) collectively represent all image date in the image frame, but each sub-frame only includes some of the image data (e.g., the pixels with depth values within the range associated with the sub-frame).

To produce the volumetric image for display, processor(s) 560 is configured to coordinate the output of the sub-frames for display at light emission device array 510 and the focal distance of the varifocal optical system 530. For example, processor(s) 560 may be configured to control the state of the lens and/or other optical elements within varifocal optical system 530 such that the focal distance of the varifocal optical system correlates with the depth associated with the displayed sub-frame. To display an entire image frame, processor(s) 560 is configured to control light emission device array 510 to output the sub-frames in a sequence and control the focal state of varifocal optical system 530 in a corresponding sequence such that the focal distance of the varifocal optical system correlates with the depth associated with the displayed sub-frame. This technique takes advantage of persistence of vision, which allows the user's visual system to effectively combine the portions of the image data included in the sub-frames to recreate the image frame.

Figure 6:
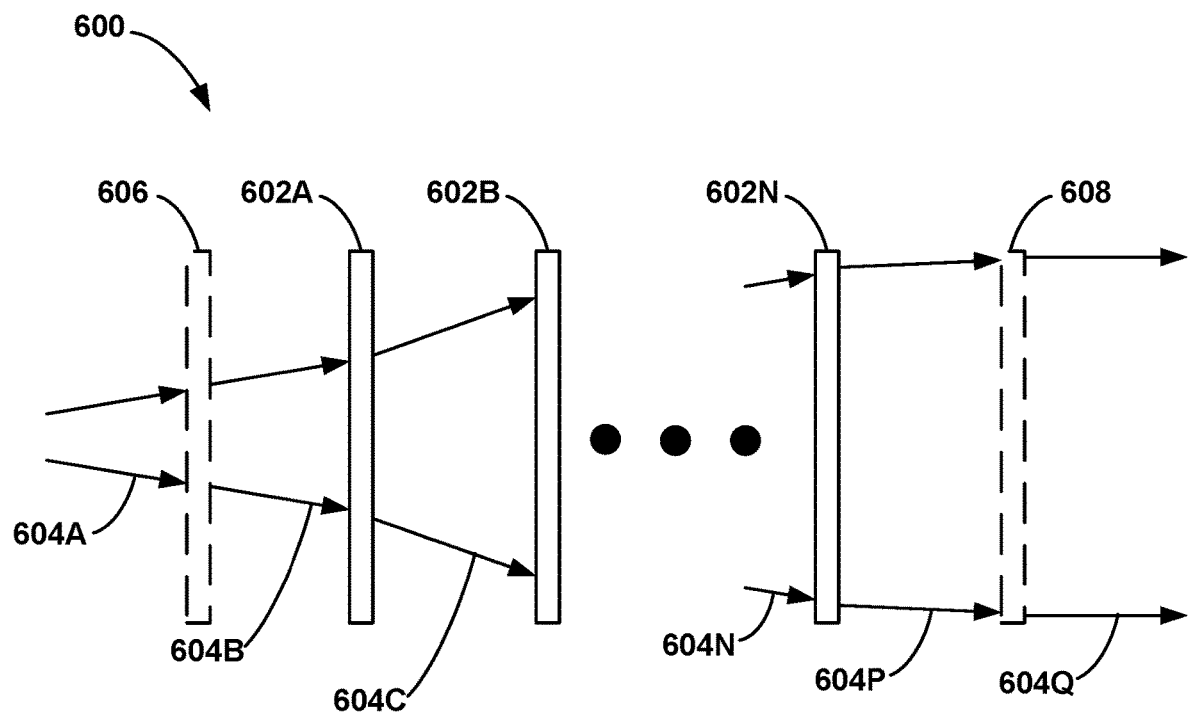
FIG. 6 is a conceptual diagram illustrating an example varifocal optical system in accordance with some examples of the disclosure.

FIG. 6 is a conceptual diagram illustrating a varifocal optical system 600 in accordance with some examples of the disclosure. Varifocal optical system 600 is an example of varifocal optical system(s) 205 or 530. Optical systems, in general, can be used to provide focusing power for a display device, such as display device(s) 203. The disclosed examples utilize varifocal optical assembly 600 to enable display devices to have adjustable optical power in support of a volumetric display.

As shown in FIG. 6, varifocal optical system 700 includes a plurality of successive optical stages 602A, 602B, . . . , 602N (also referred to herein as "optical stage(s) 602") configured to transmit light (e.g., light 604A-604Q) at various optical powers. Except for first optical stage 602A, each optical stage of the successive optical stages receives incident light that is output from a prior optical stage. For example, as shown, second optical stage 602B receives light 604C that is output from first optical stage 602A. In some examples, each stage of the successive optical stages 602 is configurable to be in any of a plurality of states including at least a first state and a second state. In the first state, the respective optical stage has a first corresponding optical power for light of a first polarization and a second corresponding optical power, different from the first corresponding optical power, for light of a second polarization that is orthogonal to the first polarization. In the second state, the respective optical stage has a third optical power for light of the first polarization and a fourth optical power for light of the second polarization. As a result, an overall optical power of varifocal optical system 600 is variable by configuring one or more of the successive optical stages 602.

Varifocal optical assembly 600 is configured to have an overall optical power that can be at any of at least two different levels of optical power for one or more two optical stages. The overall optical power can have a larger number of different levels of optical power by adding more stages, or by including one or more stages each having an electronic lens with fast response time, such as an active liquid-crystal optical phase array adjustable lens with continuously tunable optical power within a certain range. In some examples, varifocal optical system 600 may further include one or more optical elements 606 before the first optical stage and/or one or more optical elements 608 after a last optical stage 602N.

Figure 7:
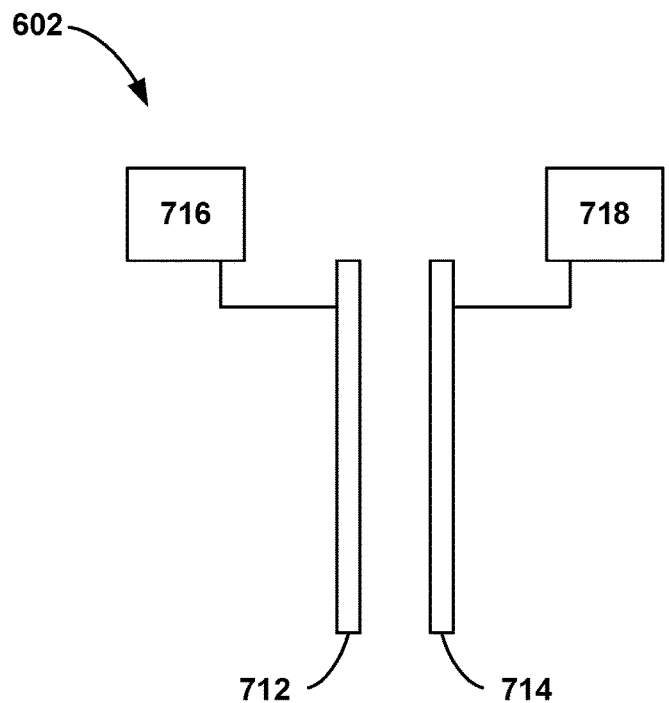
FIG. 7 is a conceptual diagram of an example optical stage of a varifocal optical system, which optical stage includes a first optical element and a second optical element in optical series with the first optical element in accordance with some examples of the disclosure.

Each optical stage 602 may include at least one optical element. For example, an optical stage may include a pair of optical elements. FIG. 7 is a conceptual diagram of an example optical stage 602 including a first optical element 712 and a second optical element 714 in optical series with first optical element 712.

First optical element 712 is configurable via a controller 716 to be in a first optical element state or a second optical element state. Controller 716 is an example of processor(s) 560 shown in FIG. 5. First optical element 712 may be a switchable optical retarder, such as a switchable half waveplate. In the first optical element state (e.g., an "off" state), first optical element 712 may be configured to convert light of a first or second polarization into light of a second or first polarization, respectively. The first polarization may be substantially orthogonal (e.g., orthogonal or nearly orthogonal) to the second polarization. In the second optical element state, first optical element 712 transmits incident light without changing polarization of the light. For example, when controller 716 sets first optical element 712 to the first state (e.g., by not applying a voltage across first optical element 712), left circularly polarized (LCP) light incident upon first optical element 712 will be output as right circularly polarized (RCP) light, and vice versa. In contrast, when controller 716 sets first optical element 712 to the second state (e.g., by applying a voltage across first optical element 712), light incident upon first optical element 712 will be transmitted without a change in its polarization (e.g., LCP light remains LCP and RCP light remains RCP).

First optical element 712 may include a liquid crystal (LC) cell, such as a nematic LC cell, a nematic LC cell with chiral dopants, a chiral LC cell, a uniform lying helix (ULH)

LC cell, a Pi LC cell, a ferroelectric LC cell, or the like. In other examples, the LC cell includes an electrically drivable birefringence material. In some examples, the LC cell may be switchable at a relatively high speed (e.g., less than 5 milliseconds, less than 2 milliseconds, less than 1 millisecond, or the like). In some examples, first optical element 712 includes at least one ferroelectric LC cell. Ferroelectric LC cells are based on smectic C* LCs (chiral smectic LCs) that exhibit bi-stable configurations. The two stable configurations may be switched between using an applied voltage. Ferroelectric LC cells may exhibit fast switching times, such as less than 1 microsecond or less than 100 microseconds. The fast switching times may support relatively high frame rates for the volumetric display, particular in examples in which an image frame is divided into many sub-frames. For example, to support a volumetric display at 100 hertz frame rate and 10 sub-frames per frame, a switching rate of less than 1 microsecond may be desired to reduce or substantially eliminate optical artifacts caused by uncoordinated switching of varifocal optical system 600 and display of sub-frames by light emission device array 510.

Second optical element 714 is configured to receive light transmitted through first optical element 712. Second optical element 714 may be a focusing optical element (e.g., a lens). In some examples, second optical element 714 is a polarization sensitive optical element. For example, second optical element 714 may include one or more of a PBP lens (also called a geometric phase lens), PSH lens, a metamaterial or metasurface, and a liquid crystal optical phase array. Details regarding PBP lenses and PSH lenses are provided below with respect to FIGS. 9A-9D and FIGS. 10A-10D, respectively.

Second optical element 714 may be passive (e.g., not connected to a controller 718 configured to selectively apply a voltage to second optical element 714 to change properties of second optical element 714) or active (e.g., connected to a controller 718 configured to selectively apply a voltage to second optical element 714 to change properties of second optical element 714). In examples in which second optical element 714 is passive, second optical element 714 has a first optical power for light of the first polarization and a second optical power, different from the first optical power, for light of the second polarization. In some examples, the second respective optical power is less than the first respective optical power. For example, the second respective optical power may be zero. For instance, second optical element 714 may exhibit a first optical power that is non-zero for RCP light and be configured convert the RCP light to LCP light while converging or diverging (depending on the first optical power) the RCP light. Second optical element 714 may be configured to transmit LCP light without focusing or changing the polarization of the LCP light.

In other examples, the second respective optical power is about equal in magnitude to the first respective optical power but is opposite in sign (effect) from the first respective optical power. For example, second optical element 714 may act as a positive lens that has an optical power of +0.5 diopters for incident light that is RCP and may act as a negative lens that has an optical power of −0.5 diopters for incident light that is LCP. Thus, the optical power of the second optical element 714, and therefore the optical power of the optical stage 602, may be based on the state of first optical element 712 and the polarization of light incident to optical stage 602.

In some examples, second optical element 714 is an active optical element that is configurable via controller 718 to be in a third optical element state (e.g., an "off" state) or a fourth optical element state (e.g., an "on" state). Controller 718 may be an example of processor(s) 560 shown in FIG. 5. In the third optical element state, active second optical element 714 is configured to have the first respective optical power for incident light having the first polarization and the second respective optical power for incident light having the second polarization, as described above with respect to examples in which second optical element 714 is passive. In the fourth optical element state, the active second optical element 714 is configured to have zero optical power and is configured to transmit the incident light without exerting optical power regardless of polarization of the incident light. As a result, optical stage 602 including first optical element 712 and an active second optical element 714 can exhibit more than two different states depending on the states of first optical element 712 and active second optical element 714.

In some examples, second optical element 714 is a thin film on a surface of first optical element 712.

Second optical element 714 has an associated optical power (or multiple associated optical powers), which may be the same or different from second optical elements in other optical stages 602. In some examples, a magnitude(s) of the optical power of second optical element 714 is no greater than 2.0 diopters (e.g., the optical power is no stronger than −2 diopters or +2 diopters).

In some examples, an optical stage of the successive optical stages 602 (FIG. 6) includes only one of a first optical element 712 and an active second optical element 714. For example, an optical stage of the successive optical stages 702 may include active second optical element 714 without including first optical element 712.

Thus, controllers 716 and 718 (which are examples of processor(s) 560 of FIG. 5) may control the overall optical power of varifocal optical assembly 500 (FIG. 5) is adjustable by controlling the respective states of optical stages 602, as described with respect to FIG. 7.

FIGS. 8A-8D are schematic diagrams illustrating a Pancharatnam-Berry phase (PBP) lens 800 in accordance with some examples. In some embodiments, second optical element 714 of an optical stage 602 in varifocal optical assembly 600, described above with respect to FIGS. 6 and 7, includes PBP lens 800. In some examples, PBP lens 800 is a liquid crystal optical element that includes a layer of liquid crystals. In some examples, PBP lens 800 includes a layer of other type of substructures, e.g., nanopillars composed of high refraction index materials.

PBP lens 800 adds or removes optical power based in part on polarization of incident light. For example, if RCP light is incident on PBP lens 800, PBP lens 800 acts as a positive lens (i.e., it causes light to converge). If LCP light is incident on PBP lens 800, PBP lens 800 acts as a negative lens (i.e., it causes light to diverge). PBP lens 800 also changes the handedness of light to the orthogonal handedness (e.g., changing LCP to RCP or vice versa). PBP lenses are also wavelength selective. If the incident light is at the designed wavelength, LCP light is converted to RCP light, and vice versa. In contrast, if incident light has a wavelength that is outside the designed wavelength range, at least a portion of the light is transmitted without change in its polarization and without focusing or converging. PBP lenses may have a large aperture size and can be made with a very thin liquid crystal layer. Optical properties of the PBP lens (e.g., focusing power or diffracting power) are based on variation of azimuthal angles (θ) of liquid crystal molecules. For example, for a PBP lens, azimuthal angle θ of a liquid crystal molecule is determined based on Equation (1):

$$\theta = \left(\frac{r^2}{f} * \frac{\pi}{\lambda}\right)\bigg/2 \qquad (1)$$

where r denotes a radial distance between the liquid crystal molecule and an optical center of the PBP lens, f denotes a focal distance, and λ denotes a wavelength of light for which the PBP lens is designed. In some examples, the azimuthal angles of the liquid crystal molecules in the x-y plane increase from the optical center to an edge of the PBP lens. In some examples, as expressed by Equation (1), a rate of increase in azimuthal angles between neighboring liquid crystal molecules also increases with the distance from the optical center of PBP lens 800. PBP lens 800 creates a respective lens profile based on the orientations (i.e., azimuthal angle θ) of a liquid crystal molecule in the x-y plane of FIG. 8A. In contrast, a (non-PBP) liquid crystal lens creates a lens profile via a birefringence property (with liquid crystal molecules oriented out of x-y plane, e.g., a non-zero tilt angle from the x-y plane) and a thickness of a liquid crystal layer.

FIG. 8A illustrates a three-dimensional view of PBP lens 800 with incoming light 804 entering the lens along the z-axis.

FIG. 8B illustrates an x-y-plane view of PBP lens 800 with a plurality of liquid crystals (e.g., liquid crystals 802A and 802B) with various orientations. The orientations (i.e., azimuthal angles θ) of the liquid crystals vary along reference line between A and A' from the center of PBP lens 800 toward the periphery of PBP lens 800.

FIG. 8C illustrates an x-z-cross-sectional view of PBP lens 800. As shown in FIG. 8C, the orientations of the liquid crystal (e.g., liquid crystals 802A and 802B) remain constant along z-direction. FIG. 8C illustrates an example of a PBP structure that has constant orientation along the z-axis and a birefringent thickness (Δn×t) that is ideally half of the designed wavelength, where Δn is the birefringence of the liquid crystal material and t is the physical thickness of the plate.

In some examples, a PBP optical element (e.g., lens) may have a liquid crystal structure that is different from the one shown in FIG. 8C. For example, a PBP optical element may include a double twist liquid crystal structure along the z-direction. In another example, a PBP optical element may include a three-layer alternate structure along the z-direction in order to provide achromatic response across a wide spectral range.

FIG. 8D illustrates a detailed plane view of the liquid crystals along the reference line between A and A' shown in FIG. 8B. Pitch 806 is defined as a distance along the x-axis at which the azimuthal angle θ of a liquid crystal has rotated 180 degrees. In some examples, pitch 806 varies as a function of distance from the center of PBP lens 800. In a case of a lens, the azimuthal angle θ of liquid crystals varies in accordance with Equation (1) shown above. In such cases, the pitch at the center of the lens is longest and the pitch at the edge of the lens is shortest.

FIGS. 9A-9D are schematic diagrams illustrating a polarization sensitive hologram (PSH) lens in accordance with some examples. In some examples, second optical element 714 of an optical stage 602 in varifocal optical system 600, described above with respect to FIGS. 6 and 7, includes PSH lens 900. PSH lens 900 is a liquid crystal PSH lens including a layer of liquid crystals arranged in helical structures (e.g., a liquid crystal formed of a cholesteric liquid crystal). Like a PBP lens (described above with respect to FIG. 8A-8D), a PSH lens 900 adds or removes optical power based in part on polarization of an incident light. However, PSH lens 900 is selective with respect to circular polarization of light. When a state (handedness) of the circularly polarized light is along a helical axis of a liquid crystal, PSH lens 900 interacts with the circularly polarized light and thereby changes the direction of the light (e.g., refracts or diffracts the light). Concurrently, while transmitting the light, PSH lens 900 also changes the polarization of the light. In contrast, PSH lens 900 transmits light with opposite circular polarization without changing its direction or polarization. For example, PSH lens 900 may change polarization of RCP light to LCP light and simultaneously focus or defocus the light while transmitting LCP light without changing its polarization or direction. Optical properties of PSH lens 900 (e.g., focusing power of diffracting power) are based on variation of azimuthal angles of liquid crystal molecules. In addition, the optical properties of the PSH are based on a helical axis and/or a helical pitch of a liquid crystal.

FIG. 9A illustrates a three-dimensional view of PSH lens 800 with incoming light 904 entering the lens along the z-axis. FIG. 9B illustrates an x-y plane view of PSH lens 900 with a plurality of liquid crystals (e.g., liquid crystals 902A and 902B) with various orientations. The orientations (i.e., azimuthal angle θ) of the liquid crystals vary along reference line between B and B' from the center of PSH lens 900 toward the periphery of PSH lens 900.

FIG. 9C illustrates an x-z-cross-sectional view of PSH lens 900. As shown in FIG. 9C, in contrast to PBP lens 800 described with respect to FIG. 8C, the liquid crystals (e.g., liquid crystals 902A and 902B in FIG. 9B) of PSH lens 900 are arranged in helical structures 918. Helical structures 918 have helical axes aligned parallel to the z-axis. As the azimuthal angle of respective liquid crystals on the x-y-plane varies, the helical structures create a volume grating with a plurality of diffraction planes (e.g., planes 920A and 920B) forming cycloidal patterns. The diffraction planes (e.g., Bragg diffraction planes) defined in a volume of PSH lens 900 are a result of a periodically changing refractive index. Helical structures 918 define the polarization selectivity of PSH lens 900, as light with circular polarization handedness corresponding to the helical axis is diffracted while light with circular polarization with the opposite handedness is not diffracted. Helical structures 918 also define the wavelength selectivity of PSH lens 900, as helical pitch 922 determines which wavelength(s) are diffracted by PSH lens 900 (light with other wavelengths is not diffracted). For example, for a PSH lens, the designed wavelength for which the PSH lens will diffract the light is determined based on Equation (2):

$$\lambda = 2n_{eff}P_z \qquad (2)$$

where λ denotes a wavelength of light that PSH lens 900 is designed for, $P_z$ is distance of helical pitch 922, and $n_{eff}$ is the effective refractive index of the liquid crystal medium that is a birefringent medium. A helical pitch refers to a distance when a helix has made a 180 degree turn along a helical axis (e.g., the z-axis in FIG. 9C). The effective refractive index of the birefringent liquid crystal medium is determined based on Equation (3):

$$n_{eff} = \sqrt{\frac{n_0^2 + 2n_e^2}{3}} \qquad (3)$$

where $n_o$ is the ordinary refractive index of the birefringent medium and $n_e$ is the extraordinary refractive index of the birefringent medium.

FIG. 9D illustrates a detailed plane view of the liquid crystals along the reference line between B and B' in FIG. 9B. Pitch 906 is defined as a distance along x-axis at which the azimuth angle of liquid crystal has rotated 180 degrees from the initial orientation. In some embodiments, pitch 906 varies as a function of distance from the center of PSH lens 900. In a case of a lens, the azimuthal angle of liquid crystals varies in accordance with Equation (1) shown above. In such cases, the pitch at the center of the lens is the longest and the pitch at the edge of the lens is the shortest.

FIGS. 10A-10D are images or an example image frame 1002 and a plurality of sub-frames generated from the image frame. Image frame 1002 include a plurality of objects, including a first character 1004, a chest 1006, a second character 1008, a third character 1010, a well 1012, and a sun 1014. The objects shown in FIGS. 10A-10D are merely examples, and the concepts described with reference to FIGS. 10A-10D may be applied to any objects in any image frame. Each object shown in FIGS. 10A-10D is a combination of a plurality of pixels.

As described above, processor(s) 560 may be configured to bin pixels based on depth information associated with the pixels. In the example of FIGS. 10A-10D, processor(s) 560 is configured to bin pixels in three bins. In other examples, processor(s) 560 may be configured to bin pixels in any number of bins (e.g., at least two bins). The bins may be predefined and static (e.g., each bin is associated with a predefined, static range of depth values) or may be dynamic (e.g., the range with each bin is determined on a frame-by-frame or other basis, for example, depending on complexity of the scene as a function of depth).

Figure 10A:
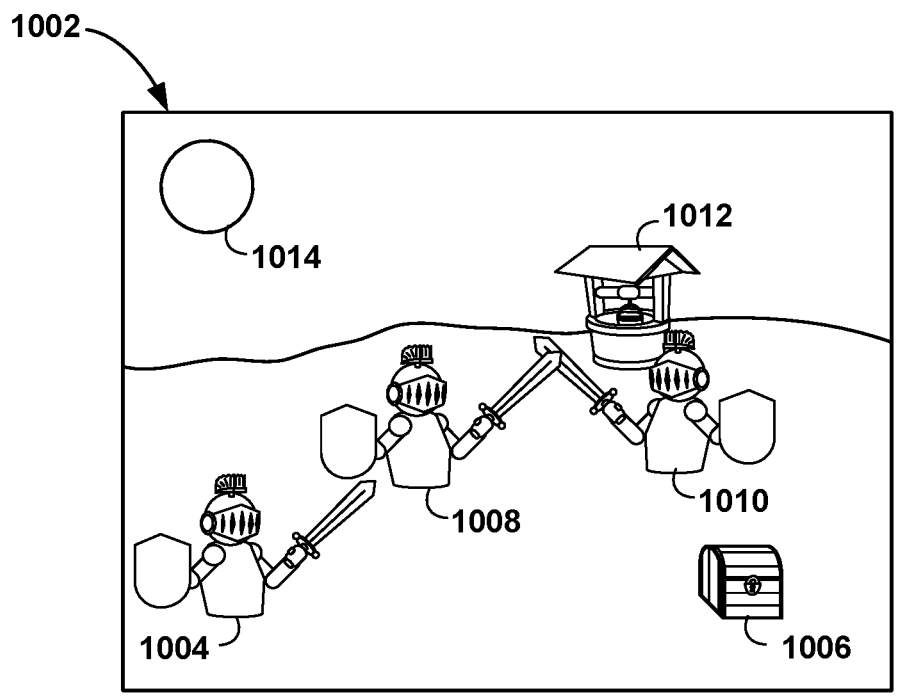
FIGS. 10A-10D are images or an example image frame and a plurality of sub-frames generated from the image frame in accordance with some examples of the disclosure.
Figure 10B:
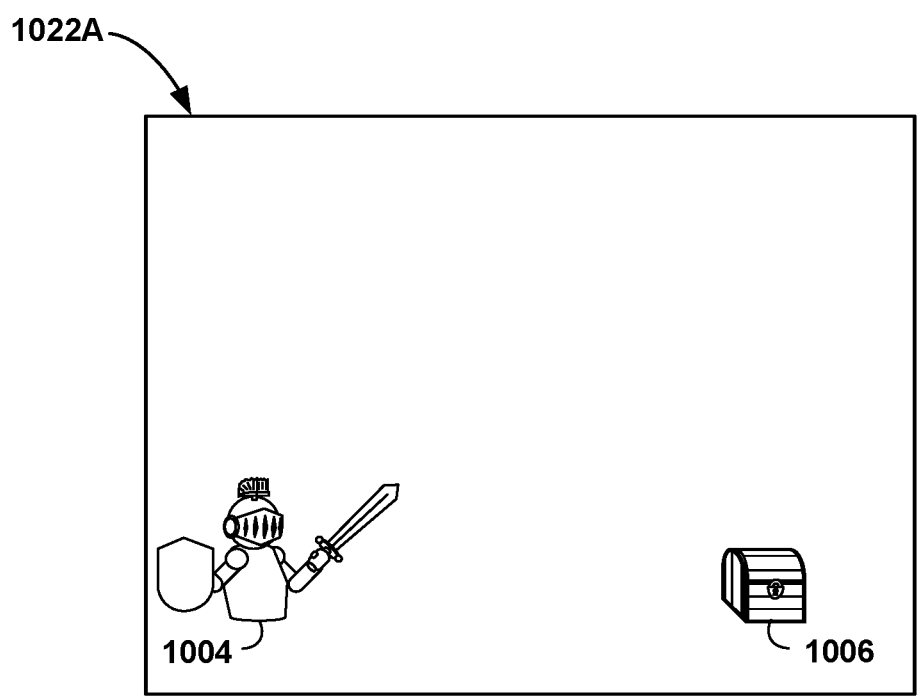

As shown in FIG. 10B, processor(s) 560 may be configured to group pixels with associated depth values indicative of being relatively close to the virtual camera position in a first bin. As described above, the virtual camera position may correlate with a viewing perspective of HMD 112 (FIG. 1). These pixels may be representing objects 1004 and 1006 relatively close to the virtual camera position and the viewpoint of the user of HMD 112. First sub-frame 1022A may include only pixels associated with the first bin and may not display pixels associated with depth values falling outside of the first bin. For example, the first bin may include pixels associated with depth values between 0 and a first depth value D1.

Figure 10C:
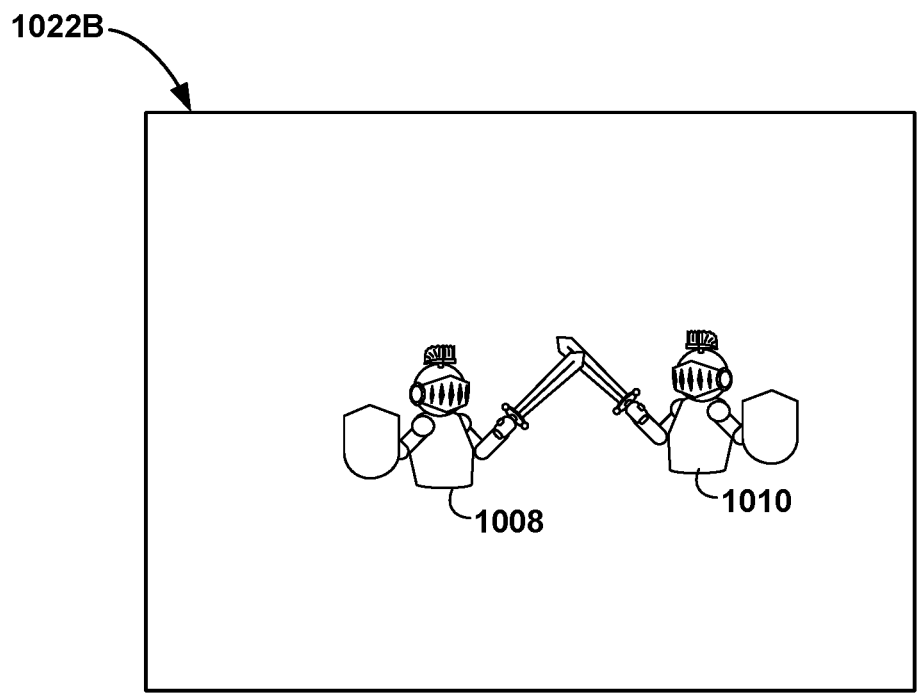

As shown in FIG. 10C, processor(s) 560 may be configured to group pixels with associated depth values indicative of being relatively mid-distance from the virtual camera position in a second bin. These pixels may be representing objects 1008 and 1010. Second sub-frame 1022B may include only pixels associated with the second bin and may not display pixels associated with depth values falling outside of the second bin. For example, the second bin may include pixels associated with depth values between first depth value D1 and a second depth value D2.

Figure 10D:
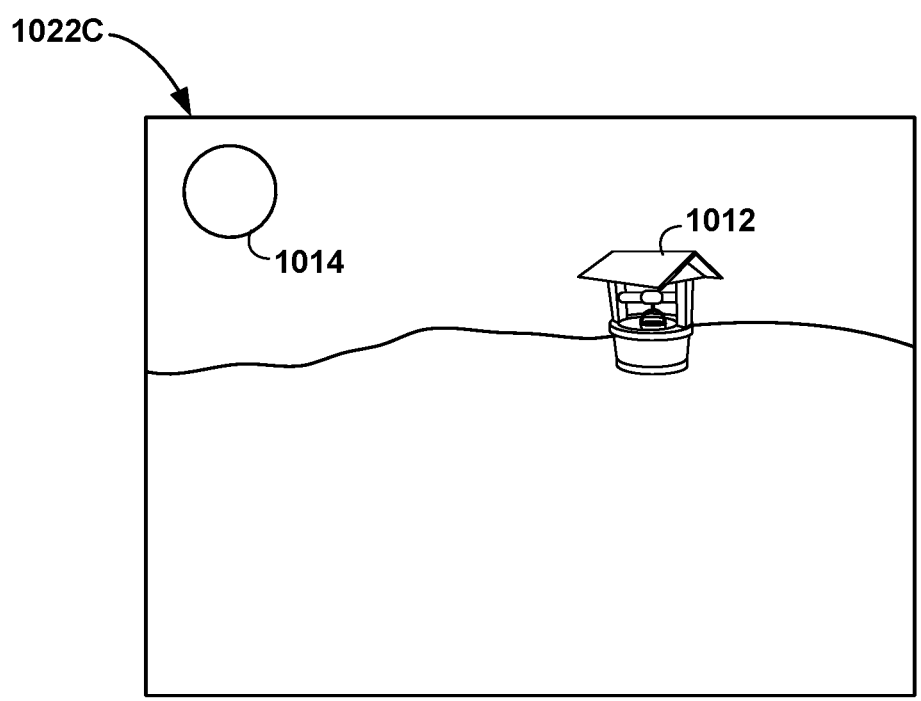

As shown in FIG. 10D, processor(s) 560 may be configured to group pixels with associated depth values indicative of being relatively mid-distance from the virtual camera position in a second bin. These pixels may be representing objects 1012 and 1014. Third sub-frame 1022C may include only pixels associated with the third bin and may not display pixels associated with depth values falling outside of the third bin. For example, the third bin may include pixels associated with depth values greater than the second depth value D2.

In the example shown in FIGS. 10A-10D, the pixels representing each object are grouped within a single bin. For example, all pixels representing first character 1004 are grouped within the first bin and used to generate first sub-frame 1022A. However, this may not be the case in all instances, e.g., depending on the number of bins (and sub-frames) and/or the size and position of the object within the image frame. For example, if the object includes a large building extending from near the virtual camera position deep into the background, pixels representing the large building may be grouped in multiple bins.

In this way, processor(s) 560 may generate a plurality of sub-frames from an image frame. Processor(s) 560 may perform a similar binning technique to generate sub-frames for each image frame in a sequence of images that makes up a virtual reality viewing experience. In other examples, the sub-frames may be pre-generated (e.g., by another device) and processor(s) 560 may simply output the pre-generated sub-frames for display at light emission device array 510.

Figure 11:
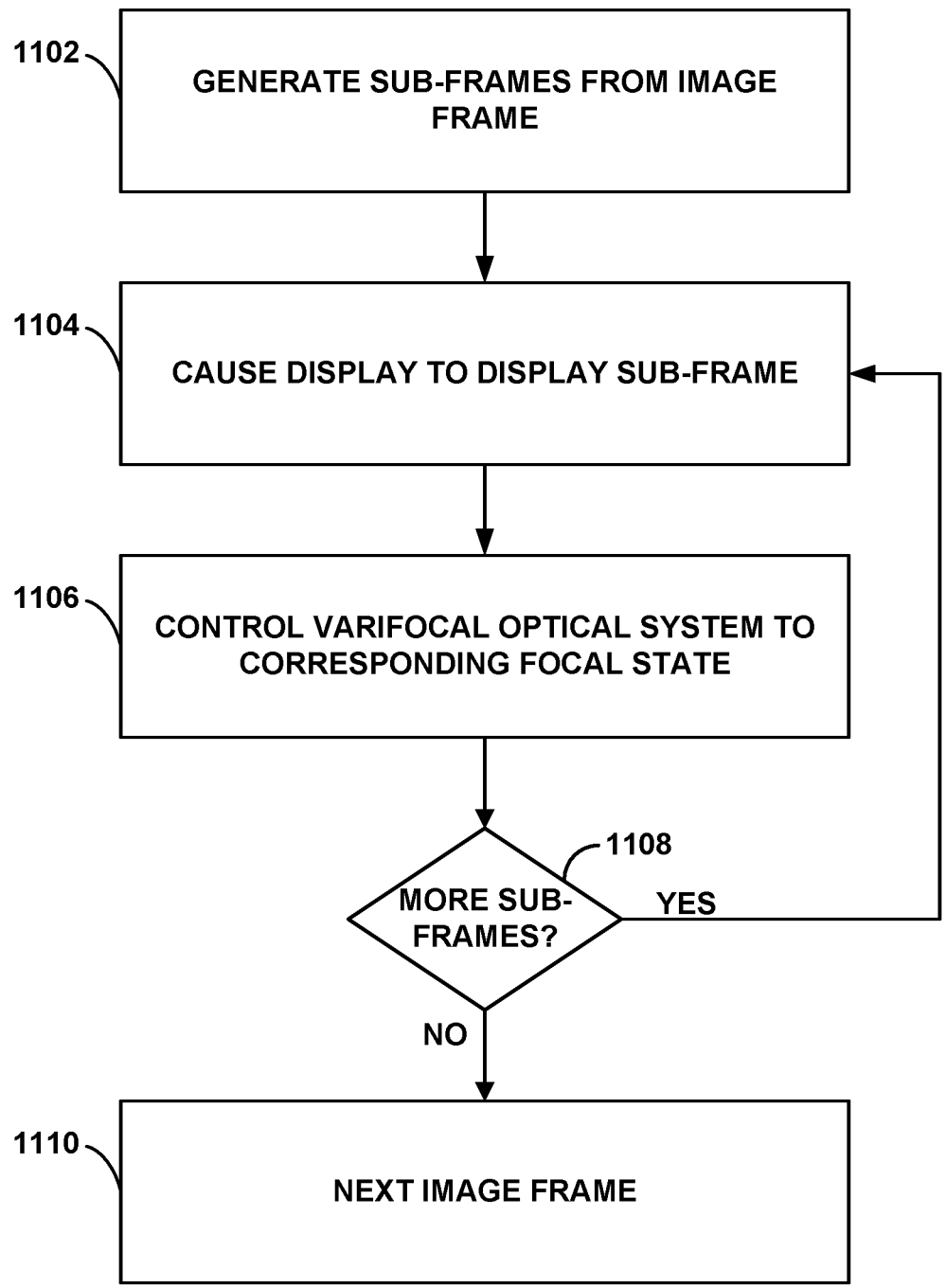
FIG. 11 is a flow diagram illustrating an example technique for generating a volumetric display using a display and a varifocal optical system in accordance with some examples of the disclosure.

FIG. 11 is a flow diagram illustrating an example technique for generating a volumetric display using a display and a varifocal optical system. The technique of FIG. 11 will be described with concurrent reference to volumetric display 500, varifocal optical system 600, and optical stage 602 of FIGS. 5-7, although it will be apparent that the technique of FIG. 11 may be performed using other systems.

In some examples, processor(s) 560 may generate a plurality of sub-frames from an image frame (1102), as described above with reference to FIGS. 10A-10D. In other examples, the sub-frames may be pre-generated (e.g., by another device, such as console 106).

Processor(s) 560 cause a sub-frame to be displayed at light emission device array 510 (1104). Processor(s) 560 also control varifocal optical system 600 to a corresponding focal state (1106). For example, processor(s) 560 may output control signals to each optical stage 602 (e.g., each first optical element 712 and each second optical element 714) to set each optical stage 602 to a state such that varifocal optical system 600 produces a selected optical power corresponding to the sub-frame being displayed by light emission device array 510.

In some examples, varifocal optical system 600 may have a defined number of focal powers, and each focal power may be associated with a corresponding sub-frame within an image frame. For example, each first sub-frame may include pixels representing objects closest to the virtual camera position within the image frame, each second sub-frame may include pixels representing objects at mid-distance within the image frame, and each third sub-frame may include pixels representing objects at longer distance to the virtual camera position within the image frame. For each image frame, the sub-frames may be output in this defined order. As such, processor(s) 560 may output control signals that cause varifocal optical system 600 to cycle through three focal powers in a coordinated manner with display of the three sub-frames.

In some examples, processor(s) 560 coordinate the focal state of varifocal optical system 600 and the display of a substrate by controlling varifocal optical system 600 to achieve a selected optical state (focal power) associated with a sub-frame prior to image light associated with the sub-frame propagating through varifocal optical system 600. This may reduce or substantially eliminate optical artifacts that may be caused by focal changes while image light is propagating through varifocal optical system 600. For example, processor(s) 560 may control varifocal optical system 600 to change focal state from a focal state associated with a first sub-frame to a focal state associated with a second sub-frame during time between the end of light emission device array 510 outputting image light associated with the first sub-frame and the beginning of light emission device array 510 outputting image light associated with the second sub-frame.

Processor(s) 560 may cause a sub-frame to be displayed at light emission device array 510 (1104) and control varifocal optical system 600 to a corresponding focal state (1106) for each sub-frame of an image frame. Once all sub-frames have been displayed (the "NO" branch of decision block 1108), processor(s) 560 may proceed to a subsequent image frame (1110). In this way, by dividing image frames into sub-frames, each sub-frame including only some of the pixels of the image frame and coordinating the focal state of a varifocal optical assembly, a volumetric display may be generated. Such a display may produce the appearance of three-dimensional depth to a user using a two-dimensional display.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs or videos). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., extended reality (ER), a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. A volumetric display comprising:
   a two-dimensional display;
   a varifocal optical system configured to receive image light from the two-dimensional display and focus the image light; and
   at least one processor configured to:
   control the two-dimensional display to cause a plurality of sub-frames associated with an image frame to be displayed by the display in an order corresponding to a depth value range of each sub-frame of the plurality of sub-frames, wherein each sub-frame of the plurality of sub-frames includes a corresponding portion of image data associated with the image frame, wherein each sub-frame includes a plurality of pixels of the image frame binned into the sub-frame based on depth values associated with the pixels, and wherein the depth value range of each sub-frame is determined based on the depth values associated with the pixels such that a first sub-frame of the plurality of sub-frames includes one or more first pixels, of the plurality of pixels, having depth values between a first depth and a second depth greater than the first depth and a second sub-frame of the plurality of sub-frames includes one or more second pixels, of the plurality of pixels, having depth values greater than the second depth; and control the varifocal optical system to a corresponding focal state for each respective sub-frame.

2. The volumetric display of claim 1, wherein the varifocal optical system comprises a plurality of optical stages, and wherein each optical stage of the plurality of optical stages comprises a focusing optical element.

3. The volumetric display of claim 2, wherein the focusing optical element comprises a polarization sensitive focusing optical element, and wherein at least one optical stage of the plurality of optical stages further comprises a switchable wave retarder.

4. The volumetric display of claim 3, wherein the switchable wave retarder comprises a switchable half waveplate.

5. The volumetric display of claim 3, wherein the switchable wave retarder comprises at least one ferroelectric liquid crystal cell.

6. The volumetric display of claim 3, wherein the polarization sensitive focusing optical element comprises at least one of a Pancharatnam-Berry phase (PBP) lens, a polarization sensitive hologram (PSH) lens, a metamaterial, or a liquid crystal optical phase array.

7. The volumetric display of claim 1, wherein the at least one processor is further configured to control the varifocal optical system to the corresponding focal state for each of the sub-frames within a persistence of a user's vision.

8. The volumetric display of claim 1, wherein the plurality of sub-frames together recreate the image frame.

9. A system comprising:
a head-mounted display comprising:
a housing;
a two-dimensional display mechanically coupled to the housing;
a varifocal optical system mechanically coupled to the housing and configured to receive image light from the two-dimensional display and focus the image light; and
at least one processor configured to:
cause a plurality of sub-frames associated with an image frame to be displayed by the display in an order corresponding to a depth value range of each sub-frame of the plurality of sub-frames, wherein each sub-frame of the plurality of sub-frames includes a corresponding portion of image data associated with the image frame, wherein each sub-frame includes a plurality of pixels of the image frame binned into the sub-frame based on depth values associated with the pixels such that a first sub-frame of the plurality of sub-frames includes one or more first pixels, of the plurality of pixels, having depth values between a first depth and a second depth greater than the first depth and a second sub-frame of the plurality of sub-frames includes one or more second pixels, of the plurality of pixels, having depth values greater than the second depth, wherein the depth value range of each sub-frame is determined based on the depth values associated with the pixels, and wherein the plurality of sub-frames together include all of the image data associated with the image frame; and
control the varifocal optical system to a corresponding focal state for each respective sub-frame.

10. The system of claim 9, wherein the varifocal optical system comprises a plurality of optical stages, and wherein each optical stage of the plurality of optical stages comprises a focusing optical element.

11. The system of claim 10, wherein the focusing optical element comprises a polarization sensitive focusing optical element, and wherein at least one optical stage of the plurality of optical stages further comprises a switchable wave retarder.

12. The system of claim 11, wherein the switchable wave retarder comprises a switchable half waveplate.

13. The system of claim 11, wherein the switchable wave retarder comprises at least one ferroelectric liquid crystal cell.

14. The system of claim 11, wherein the polarization sensitive focusing optical element comprises at least one of a Pancharatnam-Berry phase (PBP) lens, a polarization sensitive hologram (PSH) lens, a metamaterial, or a liquid crystal optical phase array.

15. The system of claim 9, wherein the at least one processor is further configured to control the varifocal optical system to the corresponding focal state for each respective sub-frame within a persistence of user's vision.

16. The system of claim 9, further comprising a console communicatively coupled to the head-mounted display, wherein the console is configured to generate the plurality of sub-frames by binning pixels of the image frame into bins based on depth values associated with the pixels.

17. The system of claim 9, wherein the plurality of sub-frames together recreate the image frame.

18. A method comprising:
causing, by one or more processors, a plurality of sub-frames associated with an image frame to be displayed by a two-dimensional display in an order corresponding to a depth value range of each sub-frame of the plurality of sub-frames, wherein each sub-frame of the plurality of sub-frames includes a corresponding portion of image data associated with the image frame, wherein each sub-frame includes a plurality of pixels of the image frame binned into the sub-frame based on depth values associated with the pixels, wherein the depth value range of each sub-frame is determined based on the depth values associated with the pixels such that a first sub-frame of the plurality of sub-frames includes one or more first pixels, of the plurality of pixels, having depth values between a first depth and a second depth greater than the first depth and a second sub-frame of the plurality of sub-frames includes one or more second pixels, of the plurality of pixels, having depth values greater than the second depth, wherein the depth value range of each sub-frame is determined frame-by-frame, and wherein the plurality of sub-frames together include all of the image data associated with the image frame; and
controlling, by the one or more processors, a varifocal optical system to a corresponding focal state for each respective sub-frame, wherein the varifocal optical system is configured to receive image light from the two-dimensional display and focus the image light.

19. The method of claim 18, wherein the varifocal optical system comprises a plurality of optical stages, and wherein each optical stage of the plurality of optical stages comprises a focusing optical element, wherein the focusing optical element comprises a polarization sensitive focusing optical element, wherein the polarization sensitive focusing optical element comprises at least one of a Pancharatnam-Berry phase (PBP) lens, a polarization sensitive hologram (PSH)

lens, a metamaterial, or a liquid crystal optical phase array, wherein the polarization sensitive focusing optical element comprises an active polarization sensitive focusing optical element, wherein controlling the varifocal optical system comprises controlling a state of the active polarization sensitive focusing optical element, wherein at least one optical stage of the plurality of optical stages further comprises a switchable wave retarder, and wherein controlling the varifocal optical system comprises controlling a state of the switchable wave retarder.

20. The method of claim 18, wherein causing the plurality of sub-frames associated with the image frame to be displayed by the two-dimensional display and controlling the varifocal optical system to the corresponding focal state for each respective sub-frame occurs within a persistence of a user's vision.

* * * * *